United States Patent [19]
Digele

[11] Patent Number: 4,940,121
[45] Date of Patent: Jul. 10, 1990

[54] FLUID FRICTION CLUTCH
[75] Inventor: Jörg Digele, Freiberg, Fed. Rep. of Germany
[73] Assignee: Suddeutsche Kuhlerfabrik Julius Fr. Behr GmbH & Co. KG, Fed. Rep. of Germany
[21] Appl. No.: 202,548
[22] Filed: Jun. 6, 1988
[30] Foreign Application Priority Data
Jun. 10, 1987 [DE] Fed. Rep. of Germany ....... 3719279
[51] Int. Cl.$^5$ .............................................. F16D 31/00
[52] U.S. Cl. .................. 192/58 B; 192/82 T
[58] Field of Search ............................ 192/58 B, 82 T
[56] References Cited

U.S. PATENT DOCUMENTS

| | | | |
|---|---|---|---|
| 4,555,004 | 11/1985 | Nakamura et al. | 192/58 B |
| 4,627,523 | 12/1986 | Light | 192/58 B |
| 4,653,624 | 3/1987 | Mader | 192/58 B |
| 4,699,258 | 10/1987 | Johnston et al. | 192/58 B |

FOREIGN PATENT DOCUMENTS

| | | |
|---|---|---|
| 3226634 | 1/1984 | Fed. Rep. of Germany . |
| 3719279 | 3/1988 | Fed. Rep. of Germany .... 192/58 B |

Primary Examiner—Leslie A. Braun
Assistant Examiner—Andrea Pitts
Attorney, Agent, or Firm—Evenson, Wands, Edwards, Lenahan & McKeown

[57] ABSTRACT

Fluid friction clutches tend to operate discontinuously when the performance requirement is low and therefore the filling ratio in the working chamber is also low. This so-called "surging" is to be avoided. According to the invention, a forced guiding is provided for the clutch fluid from a front part of the working chamber into the rear part of the working chamber, and only then is the return flow provided to the storage chamber which is achieved by a sealing-off of the working chamber into these two areas by means of the clutch disk and by means of the arrangement of a fluid deflector with damming bodies at a part of the circumference. The resulting forced distribution of clutch fluid on both sides of the clutch disk permits a smooth operation of the clutch and, when pumping elements are arranged, also a reduction of the hysteresis. Fluid friction clutches of this type are particularly suitable for fan drives for cooling devices of motor vehicles.

16 Claims, 5 Drawing Sheets

FLUID FRICTION CLUTCH

BACKGROUND AND SUMMARY OF THE INVENTION

The invention relates to a fluid friction clutch of the type used to drive colling air fans in vehicle cooling systems and the like. A fluid friction clutch of this type is known from German Published Unexamined Application (DE-OS) 32 26 634. In this construction, in the area of the outer circumference of the clutch disk, a damming body provided with guiding surfaces is assigned to the front side of the working chamber and is located in front of an overflow opening leading to the storage chamber. In this case, the damming body projects into a surrounding groove of the clutch disk in which the clutch oil collects at this radially most exterior point. In the known construction, two damming bodies of this type are provided diametrically opposite at the circumference of the working chamber in order to increase the amount of the returned oil. By means of constructions of this type, a so-called modulating control can be achieved; i.e., a slow rise and fall of the rotational speed of the fan assigned to the clutch in the case of higher rotational speeds and in the case of a correspondingly higher rotational slip speed. However, it is a disadvantage that during idling or in the case of low rotational drive speeds, sudden rotational speed changes are caused by the fluid friction clutch, which generally is called a "surging" of the clutch.

It is an objective of the present invention to find a development of a fluid friction clutch of the initially mentioned type by means of which a modulating control can be achieved also in the case of low rotational speeds.

For achieving this objective, damming and guide means are provided for forcing supply of clutch fluid to both sides of the disk. By means of this development, it is ensured that the clutch fluid is, in a forced manner, always supplied to both sides of the clutch disk, so that also, in the case of low rotational speeds and therefore of a small circulating amount of fluid, the wetting of the working chamber is ensured on both sides of the clutch disk. By means of the invention, a forced guiding of the clutch fluid is achieved on both sides of the working chamber. By means of this development, a uniform power transmission can be achieved also in the low rotational speed range. There will be no "surging".

In advantageous embodiments of the invention an insert is inserted into a radial recess of the clutch dividing wall which insert accommodates a return flow duct for the clutch fluid. Preferred embodiments also have a damming body formed as a diagonally extending edge at the outer circumference of the clutch disk, which edge delimits the edge of a deflecting duct. These characteristics permit a simple implementation of a fluid deflector which causes the desired deflection of the clutch fluid from the front working chamber first into the rear working chamber and from there, back into the storage chamber.

Preferred embodiments use a cylindrical shell of the disk as a sealing edge, which in a simple manner, provides the boundary between the front and the rear working chamber. Certain preferred embodiments use a housing projection as a damming body that borders on the rear side of the clutch disk providing a simple construction.

Other characteristics of preferred embodiments result in the significant advantage that the clutch disk and housing form a pumping system that contributes to the fact that the clutch fluid, in addition to the effect caused by centrifugal force, is supplied to the largest diameter. As a result, in the exterior area, where also the surrounding ring ducts are provided in the housing according to certain features of preferred embodiments, a pressure increase can be achieved. As a result, the working spaces can be emptied faster, and shorter hystereses occur for the clutch. At the same time, a stable oil ring is formed at the outer diameter which causes an extremely smooth movement of the clutch.

Other objects, advantages and novel features of the present invention will become apparent from the following detailed description of the invention when considered in conjunction with the accompanying drawings.

DETAILED DESCRIPTION OF THE DRAWING

Figure 1:
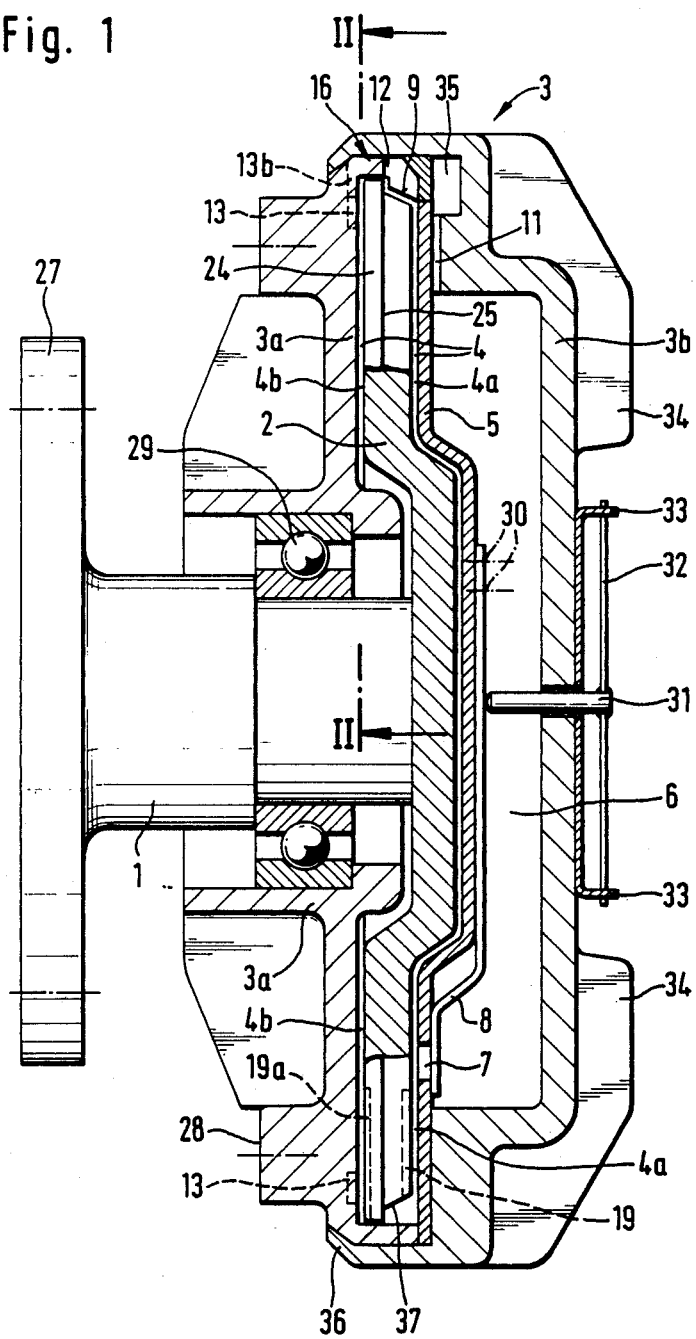
FIG. 1 is a schematic longitudinal sectional view of a fluid friction clutch constructed according to a preferred embodiment of the invention.
Figure 2:
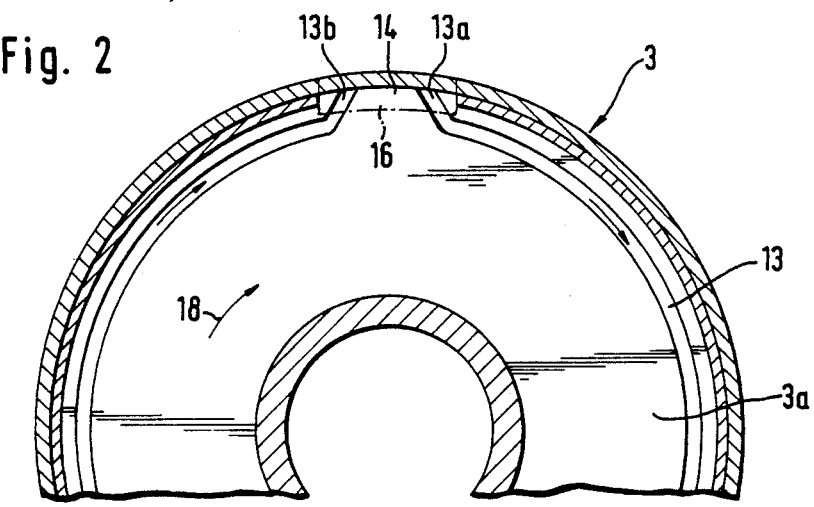
FIG. 2 is a sectional view of the clutch housing of FIG. 1 along line II—II.

FIG. 1 shows the basic construction of the fluid friction clutch according to the invention. The fluid friction clutch of FIG. 1 comprises a clutch disk 2 that is connected firmly with a driven shaft 1 and rotates in a working chamber 4 of a clutch housing 3 that is matched closely with its contours. The clutch disk 2 is used as the primary part of the clutch. The shaft 1 is equipped with a flange 27 which, in a manner not shown in detail, can be connected with a drive, for example, directly or indirectly with the crankshaft of a motor vehicle engine. The fluid friction clutch shown in FIG. 1 is used for driving a fan for the cooling system. The fan blades may, for example, be screwed at points 28, directly to housing part 3a of the housing 3 consisting of this housing part 3a and a cover 3b.

The clutch housing 3, is rotatably supported on the drive shaft 1 via a ball bearing 29. The cover 3b, with a flanged edge 36, is connected firmly with the rear housing part 3a and holds a dividing wall 5 in the shown position. This dividing wall 5, together with the rear housing part 3a, forms the working chamber 4. The dividing wall 5 also tightly separates a storage chamber 6 for the clutch fluid provided in the cover 3b from the working chamber 4. The dividing wall 5 is provided with a flow-through opening 7, through which the clutch oil, from the storage chamber 6, can controllably pass into the working chamber 4. In order to permit this controllable passage, a valve lever 8 is swivably arranged at the dividing wall 5, this valve lever 8, as a result of its inherent elasticity, tending to swivel around its hinge point 30 counterclockwise in such a way that it exposes the flow-through opening 7. However, the valve lever 8 is held in the shown position by a tappet 31 which is led tightly to the outside through the cover 3b and there is connected firmly with the bimetallic strip 32 which, at both its ends, is in each case held in a holding device 33 at the cover 3b. The bimetallic strip 32—in a manner that is known per se—detects the temperature of the air flowing through a cooler that is not shown and with a rising temperature bends through toward the outside in such a manner that the tappet 31 moves to the right and releases the swivel motion of the valve lever 8. With a rising temperature, therefore, more and more clutch fluid is moved from the storage chamber 6 on the outside into the working chamber 4. The housing 3, together with the fan blades fastened at it, is therefore, as a function of the temperature, taken along almost until the rotational drive speed of the shaft 1 is reached. The fan performance therefore increases with the rising temperature of the cooling air.

In the area radially outside the bimetallic strip 32, the cover 3b is provided with cooling ribs 34 which, when they rotate, provide that also the clutch oil located in the storage chamber 6 is subjected to a cooling. In order to ensure this also for the portion of the clutch fluid that, in each case, is located in the working chamber and is heated there under the occurring shear forces, a return flow opening is provided which will be described in greater detail and which leads into the collecting space 35 that leads out radially outside the return flow duct 11, from which collecting space 35 the return flow of the clutch fluid is caused from the working chamber into the storage chamber. As in all fluid friction clutches of the described type, the clutch fluid therefore circulates. The circulating fluid amount is temperature-dependent and is determined by the extent of the opening of the inflow opening 7.

In the case of the fluid friction clutch according to the invention, a forced circulation of the clutch fluid is now ensured by means of which the clutch fluid first passes through the part 4a of the working chamber 4 facing the dividing wall 5, then passes through the part 4b of the working chamber facing the rear side 3a of the housing, and only then, via the return flow duct 11, is returned into the storage chamber. Specifically, this is achieved in that, as shown in FIGS. 2, 3 and 4 to 8, the clutch disk 2 is provided with a surrounding edge 24, the cylindrical shell surface of which interacts with the inside diameter of the housing 3 in such a way that the front side 4a of the working chamber 4 is essentially sealed off with respect to the rear side 4b. The radially extending shoulder 25 of this edge 24 interacts with an insert 16 which will be described below.

Figure 3:
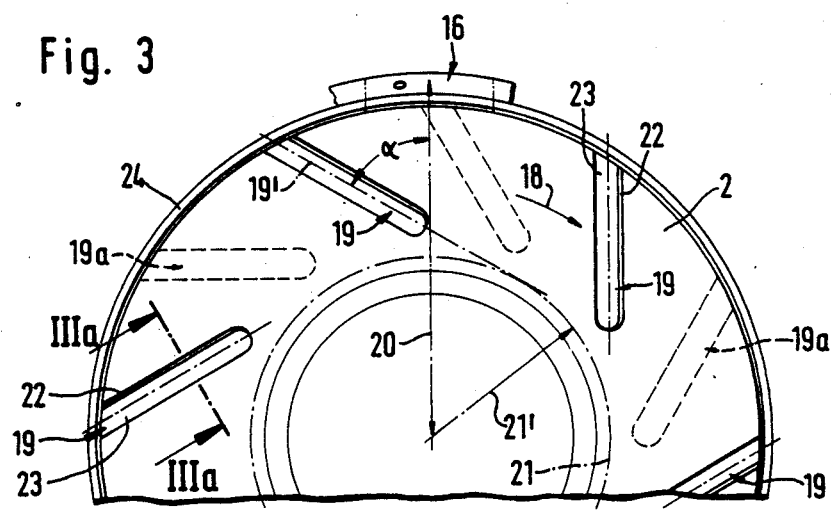
FIGS. 3 and 3a are top views of the clutch disk of the fluid friction clutch of FIG. 1.
Figure 3A:
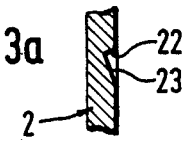

The clutch disk 2 itself, as shown in FIG. 3, on its side facing the dividing wall 5, is provided with grooves 19 that are directed diagonally to the outside toward the periphery. These grooves 19, according to FIG. 3a, have the cross-section of a right angle triangle, both catheti 22 and 23 of which being worked diagonally into the clutch disk 2. In this case, the development is such that the shorter one of the two catheti, side 22, is located in front in rotating direction 18 of the clutch disk 2 so that the longer side 23 forms a relatively long diagonal surface at which the clutch oil that is dammed up as a result of the rotation of the clutch disk 2 can be pressed to the outside. For this purpose, all grooves 19 are sloped at an angle ($\alpha$) with respect to a radius 20 of the clutch disk 2 against the rotating direction 18. Their axis 19', in each case, forms a tangent at a circle 21, the radius 21' of which is approximately half the size of the radius 20 of the clutch disk 2. As a result of this development, the grooves 19 act as pumping elements which transport the clutch fluid flowing in through the opening 7, which is located in the shearing gap of the working chamber part 4a, toward the outer circumference, where the clutch fluid is also driven into the gap between the circumferential surface of the clutch disk 2 bordering on the edge 24. This part of the circumference of the clutch disk 2, which borders on the edge 24 in the direction of the dividing wall 5, forms a conical ring surface 37.

Figure 4:
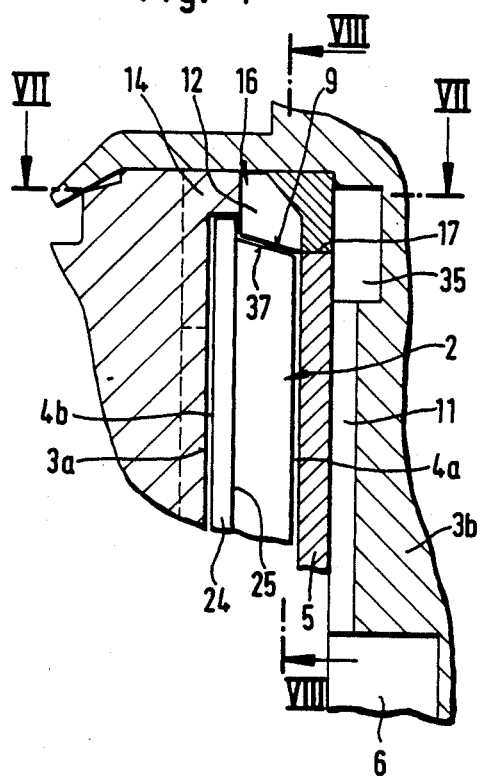
FIG. 4 is an enlarged detail of the upper area of the fluid friction clutch of FIG. 1.
Figure 5:
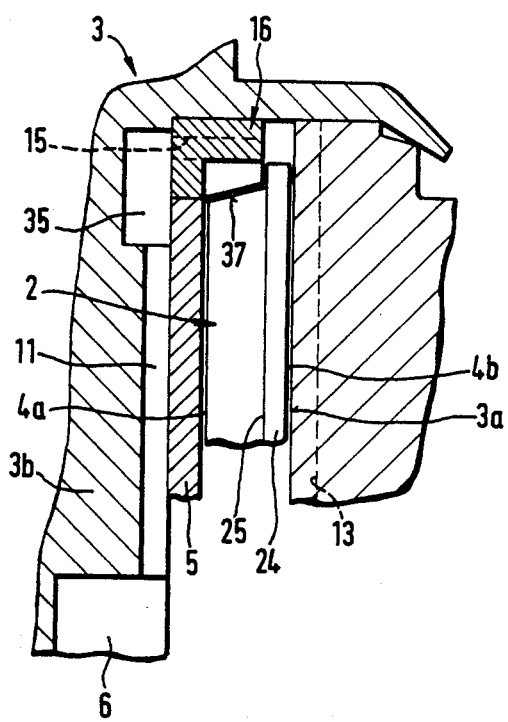
FIG. 5 a representation that is similar to FIG. 4, but from the other side, according to the sectional view V—V of FIG. 6.
Figure 6:
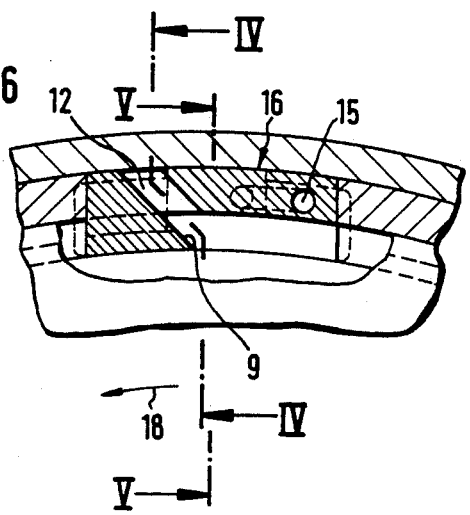
FIG. 6 is a sectional view of the clutch part of FIG. 4 along Line VI—VI in FIG. 7.

FIGS. 4 and 5 show the details of the development of this ring surface 37.

Figure 9:
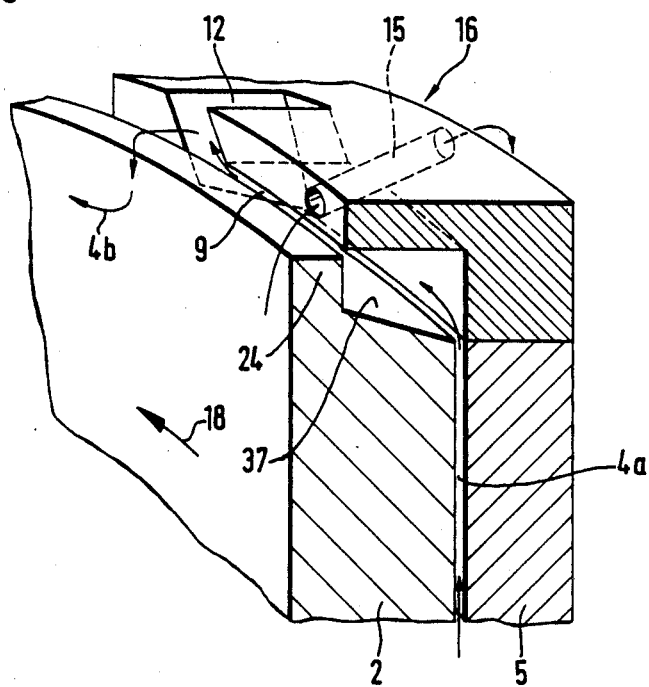
FIG. 9 is a schematic and perspective representation of the insert of the clutch of FIG. 1 that is used as a fluid deflector.

The clutch fluid, which, in this manner, collects in the outermost area of the working chamber part 4a, as shown in FIGS. 4, 5, 6 and 8, runs up against an edge 9 which, in the upper area of the working chamber 4, reaches into the working chamber 4a as a damming body, and is part of the above-mentioned insert 16 which is inserted into a radial recess 17 of the dividing wall 5 adjacent to recesses 38 and 39 in housing part 3a, which recesses 38 and 39 will be discussed below. The clutch fluid that is entrained by the clutch disk 2 therefore accumulates at the edge 9, and, inside the insert 16, by means of a deflecting duct 12, is directed to the rear side 4b of the working chamber 4. This is shown in detail in FIG. 9, where this deflecting duct 12 is shown with the damming edge 9 located at its inlet cross-section. According to FIG. 2, the rear side 3a of the housing 3, has a surrounding groove 13 in the outer circumferential area, which, with one end that is developed as a connecting arm 13a, is led into the area of the insert 16 at the point at which the deflecting duct 12 ends. The clutch fluid coming from the front side of the clutch disk 2, thus the clutch fluid coming from the working chamber area 4a, is therefore deflected, by means of the deflecting duct 12 to the rear side 4b of the working chamber 4a and into the flow duct 13 where, in the case of the given rotating direction 18 of the clutch disk, it is taken along in rotating direction and is distributed in the rear area 4b of the working chamber 4.

Figure 7:
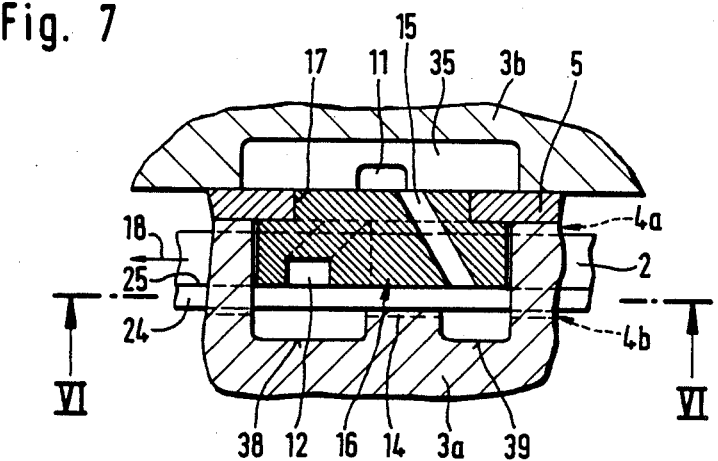
FIG. 7 a sectional view of the clutch part of FIG. 4 along Line VII—VII.
Figure 8:
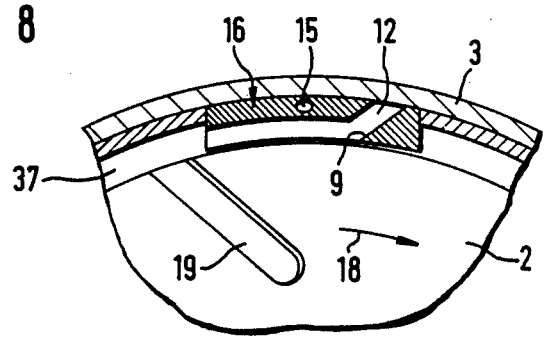
FIG. 8 is a sectional view of the clutch part of FIG. 4 along Line VIII—VIII.

The rear side of the clutch disk 2, as indicated by an interrupted line in FIG. 3, is also provided with grooves 19a, the development of which corresponds to that of grooves 19. Also on the rear side of clutch disk 2, a pumping effect is therefore exercised on the clutch fluid, by means of the effect of which the clutch fluid, during the rotation, accumulates in the flow duct 13. The other end of the flow duct 13 changes into a connecting arm 13b which also ends in the area of the insert 16. Between the outlet of the flow duct 12 and the inlet of a return flow bore 15 in the insert 16, as shown in FIG. 7, a projection 14 of the housing part 3a is provided which, on the one hand, is used as a damming body for the clutch fluid which, in the arm 13b and in rotating direction 18, is conveyed from the rear side of the clutch disk 2. The clutch fluid therefore accumulates in the arm 13b and then, through the return flow bore 15 extending in rotating direction 18 diagonally with respect to the dividing wall 5 and through it, arrives in the collecting space 35, whence the return flow can take place through the return flow duct 11 to the storage chamber 6.

Figure 10:
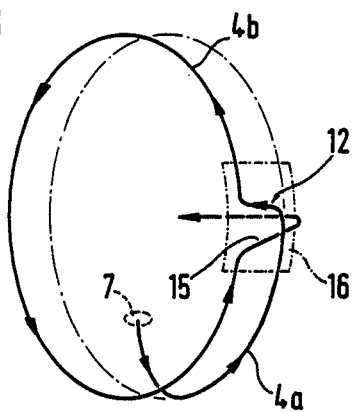
FIG. 10 is a schematic representation of the forced guiding of the clutch fluid inside the clutch housing.

By means of this development, a circulation for the clutch fluid, in a forced manner, is maintained in the working chamber 4 which is shown schematically in FIG. 10. As shown there, clutch fluid entering from the inflow opening 7 into the working chamber first, in rotating direction 18, through the front part 4a of the working chamber, arrives at the insert 16 and from there, through the deflecting duct 12, is deflected to the rear side 4b of the working chamber 4. The clutch fluid circulating on the rear side 4b of the working chamber 4 then, after one or several circulations, will again arrive in the area of the insert 16, accumulates in front of the damming body 14, and then, through the return flow bore 15, enters into the collecting space 35 not shown in FIG. 10 and from there returns to the storage chamber.

By means of the development according to the invention, a forced circulation is therefore ensured for the clutch fluid through the front side and the rear side of the working chamber. The clutch disk is therefore uniformly wetted on both sides, specifically also when only a small amount of clutch fluid is circulating in the range of the rotational idling speed or at low rotational speeds—when no fan performance is demanded.

By means of this development, a uniform filling in the working chamber can also be maintained at low rotational speeds and in the case of the then occurring low rotational slip speeds, so that the so-called "surging" of a fluid friction clutch in this speed range can be avoided.

It was found that by means of the arrangement of the grooves 19 and the resulting pumping effect in the outer area of the working chamber 4, a circulating fluid ring can always be maintained which causes an extremely smooth operation of the clutch. By means of the pressure increase in the area of the outer circumference caused by the grooves 19, a fast evacuation of the working chamber 4 is caused which, in turn, leads to the fact that shorter hystereses occur for this clutch. The forced guiding of the clutch fluid also does not have a disadvantageous effect at higher rotational speeds. It permits a construction of an, on the whole, smoothly operating fluid friction clutch which has a modulating control, also in the range of the rotational idling speed.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:
1. A fluid friction clutch comprising:
    a clutch disk which serves as a primary part and is connected firmly with a driven shaft for rotation about a clutch axis;
    a housing that serves as a secondary part and has a working chamber narrowly surrounding the clutch disk and a storage chamber for the clutch fluid which is separated from this working chamber by a dividing wall; and
    an inflow opening provided in the dividing wall which leads from the storage chamber to the working chamber, and is controllably opened or closed by means of a valve member;
    wherein said chamber includes a front working chamber part formed between the clutch disk and the dividing wall and a rear working chamber part formed between a clutch disk and a rear wall of the housing,
    wherein the front and rear working chamber parts are separated from one another by means of a sealing arrangement between the clutch disk and the housing,
    wherein a first damming body means and a deflecting duct are provided for guiding flow of clutch fluid from the front working chamber part to the rear working chamber part,
    wherein a surrounding flow duct is provided which surrounds the disks and rear working chamber part, said deflecting duct being connected with the surrounding flow duct,
    wherein a second damming body means and a return flow duct are provided for guiding flow of clutch fluid from the rear working chamber part to the front working chamber part with respect to the disk,
    and wherein said return flow duct is sealed off with respect to the deflecting duct and leads out into a return flow passage leading to the storage chamber, thereby facilitating flow of clutch fluid at both sides of the clutch disk even with low clutch fluid flow volumes through the inflow opening in the dividing wall.

2. A fluid friction clutch according to claim 1, wherein said first and second damming body means are disposed at approximately the same circumferential location at the housing.

3. A fluid friction clutch according to claim 2, wherein the deflecting duct and the return flow duct are arranged in an insert held astride and radially outwardly of the clutch disk in the housing.

4. A fluid friction clutch according to claim 3, wherein the insert is inserted into a radial recess of the dividing wall.

5. A fluid friction clutch according to claim 2, wherein the first damming body means is constructed as an edge directed diagonally against the rotating direction of the outer circumference of the clutch disk, this edge delimiting an inlet cross-section of the deflecting duct.

6. A fluid friction clutch according to claim 2, wherein the sealing arrangement between the clutch disk and the housing is formed by the cylindrical shell surface of the surrounding edge of the clutch disk, this edge resting against a correspondingly cylindrically extending wall of the housing.

7. A fluid friction clutch according to claim 6, wherein an outer circumferential area of the clutch disk located laterally next to the edge is constructed as a conical ring surface.

8. A fluid friction according to claim 2, wherein the second damming body means is developed as a housing projection that borders on the rear side of the clutch disk.

9. A fluid friction clutch according to claim 3, wherein the return flow duct is developed as a bore in the insert which extends diagonally in rotating direction of the clutch disk.

10. A fluid friction duct according to claim 1, wherein the clutch disk, at least on the front side facing the dividing wall, is provided with open grooves that are directed toward the outer circumference.

11. A fluid friction clutch according to claim 10, where the grooves define axes which extend at an angle (α), that is sloped against a rotating direction of the clutch disk, with respect to a radius of the clutch disk.

12. A fluid friction clutch according to claim 11, wherein extensions of the axes of the grooves are tangents at a circle, the center of which circle is the center of the clutch disk and the radius of which amounts to approximately half the radius of the clutch disk.

13. A fluid friction clutch according to claim 10, wherein the grooves have a cross-section of a right angle triangle of unequal side length, the catheti of which are worked into the clutch disk, and the shorter side being located in front in the rotating direction.

14. A fluid friction clutch according to claim 12, wherein the grooves have a cross-section of a right angle triangle of unequal side length, the catheti of which are worked into the clutch disk, and the shorter side being located in front in the rotating direction.

15. A fluid friction clutch according to claim 1, wherein the surrounding flow duct at the rear side of the working chamber is developed as a groove which is worked into the rear side of the housing.

16. A fluid friction clutch according to claim 15, wherein the groove, in the area of the deflecting duct and of the return flow duct, is provided with branch-off arms, of which the arm that is in the front in the rotating direction is connected with an end of the deflecting duct, and the rear arm is connected with the inlet opening of the return flow duct.

* * * * *